(12) United States Patent
Kataoka et al.

(10) Patent No.: US 9,660,513 B2
(45) Date of Patent: May 23, 2017

(54) SWITCHING DEVICE

(71) Applicant: Sharp Kabushiki Kaisha, Osaka-shi, Osaka (JP)

(72) Inventors: Kohtaroh Kataoka, Osaka (JP); Masaru Nomura, Osaka (JP); Takeshi Shiomi, Osaka (JP); Shuji Wakaiki, Osaka (JP); Akihide Shibata, Osaka (JP); Hiroshi Iwata, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 14/904,051

(22) PCT Filed: Mar. 24, 2014

(86) PCT No.: PCT/JP2014/057991
§ 371 (c)(1),
(2) Date: Jan. 8, 2016

(87) PCT Pub. No.: WO2015/004953
PCT Pub. Date: Jan. 15, 2015

(65) Prior Publication Data
US 2016/0172960 A1 Jun. 16, 2016

(30) Foreign Application Priority Data
Jul. 9, 2013 (JP) ................................. 2013-143143

(51) Int. Cl.
*H03K 3/00* (2006.01)
*H02M 1/088* (2006.01)
(Continued)

(52) U.S. Cl.
CPC ............ *H02M 1/088* (2013.01); *H02M 1/36* (2013.01); *H02M 3/158* (2013.01); *H02M 2001/008* (2013.01)

(58) Field of Classification Search
CPC .................................................. H02M 1/088
See application file for complete search history.

(56) References Cited

U.S. PATENT DOCUMENTS

2012/0229165 A1* 9/2012 Tseng ............. H03K 19/018507
326/82

FOREIGN PATENT DOCUMENTS

| JP | 07222490 A | 8/1995 |
|----|------------|--------|
| JP | 2007151322 A | 6/2007 |
| JP | 2012050216 A | 3/2012 |

OTHER PUBLICATIONS

ISA Japanese Patent Office, International Search Report Issued in Application No. PCT/JP2014/057991, Jun. 3, 2014, WIPO, 2 pages.

* cited by examiner

*Primary Examiner* — Daniel Puentes
(74) *Attorney, Agent, or Firm* — Alleman Hall Creasman & Tuttle LLP

(57) ABSTRACT

A control circuit is driven by a driving voltage ($V_{OC}$) generated by a generator circuit, and outputs a control signal. A drive circuit is driven by a driving voltage ($V_{OD}$) generated by another generator circuit, and turns a switching element inside a switching circuit on or off by supplying, to the switching circuit, a drive signal based on the control signal. During activation of a switching device, a voltage generation controller detects a voltage value of the output voltage ($V_{OC}$) of the generator circuit, and allows activation of the other generator circuit after verifying that the detected voltage value is at or above a designated threshold.

3 Claims, 10 Drawing Sheets

(51) Int. Cl.
*H02M 1/36* (2007.01)
*H02M 3/158* (2006.01)
*H02M 1/00* (2006.01)

SWITCHING DEVICE

TECHNICAL FIELD

The present invention relates to a switching device.

BACKGROUND ART

FIG. 13 illustrates an exemplary configuration of a switching device. When controlling a switching circuit such as an inverter, ordinarily a gate driver (driver circuit) that supplies a gate signal and a control circuit that controls the gate driver are provided, requiring mutually different driving voltages (3.3 V and 15 V, for example) for the gate driver and the control circuit. Consequently, it is typical to provide separately a power supply circuit for the gate driver and a power supply circuit for the control circuit (for example, see PTL 1 below).

CITATION LIST

Patent Literature

PTL 1: Japanese Unexamined Patent Application Publication No. 2010-239766

SUMMARY OF INVENTION

In FIG. 13, before the control circuit is powered up, there is a risk that a signal of an indeterminate logic state will be added to the signal line that is supposed to carry the control signal. Consequently, when the output of the power supply circuit for the gate driver rises before the output of the power supply circuit for the control circuit rises, in the time period until the output of the power supply circuit for the control circuit rises, there is a risk that the switching circuit will malfunction (a switching element turning on or off unintentionally) in response to the input of the signal of the indeterminate logic state. For example, a shoot-through current may be produced due to field-effect transistors connected in series turning on simultaneously. Malfunction of the switching circuit may cause a circuit element inside the switching circuit including the switching element, or a peripheral element, to break or degrade.

Accordingly, the present invention takes as an objective to provide a switching device that contributes to be reduced or eliminated malfunction of the switching circuit during power-up.

A switching device according to the present invention includes: a switching circuit including a switching element; a first driving voltage generator circuit that generates a first driving voltage on the basis of a first input voltage; a second driving voltage generator circuit that generates a second driving voltage on the basis of a second input voltage; a control circuit, driven by the first driving voltage, that generates a control signal; a drive circuit, driven by the second driving voltage, that turns the switching element on or off by supplying to the switching element a drive signal based on the control signal; and a voltage controller that controls the second driving voltage generator circuit so that an operation of generating the second driving voltage by the second driving voltage generator circuit is allowed after activation of the control circuit.

According to the present invention, it is possible to provide a switching device that contributes to reducing or eliminating malfunction of the switching circuit during power-up.

DESCRIPTION OF EMBODIMENTS

Hereinafter, examples of embodiments of the present invention will be described specifically with reference to the drawings. In the referenced drawings, like portions are denoted with like characters, and duplicate descriptions related to like portions will be reduced or omitted as a general rule. Note that in this specification, a symbol or character referring to a piece of information, a signal, a physical quantity, a state quantity, a member, or the like may be used, and as a result, the name of the piece of information, the signal, the physical quantity, the state quantity, the member, or the like corresponding to the symbol or character may be omitted or abbreviated.

First Embodiment

Figure 1:
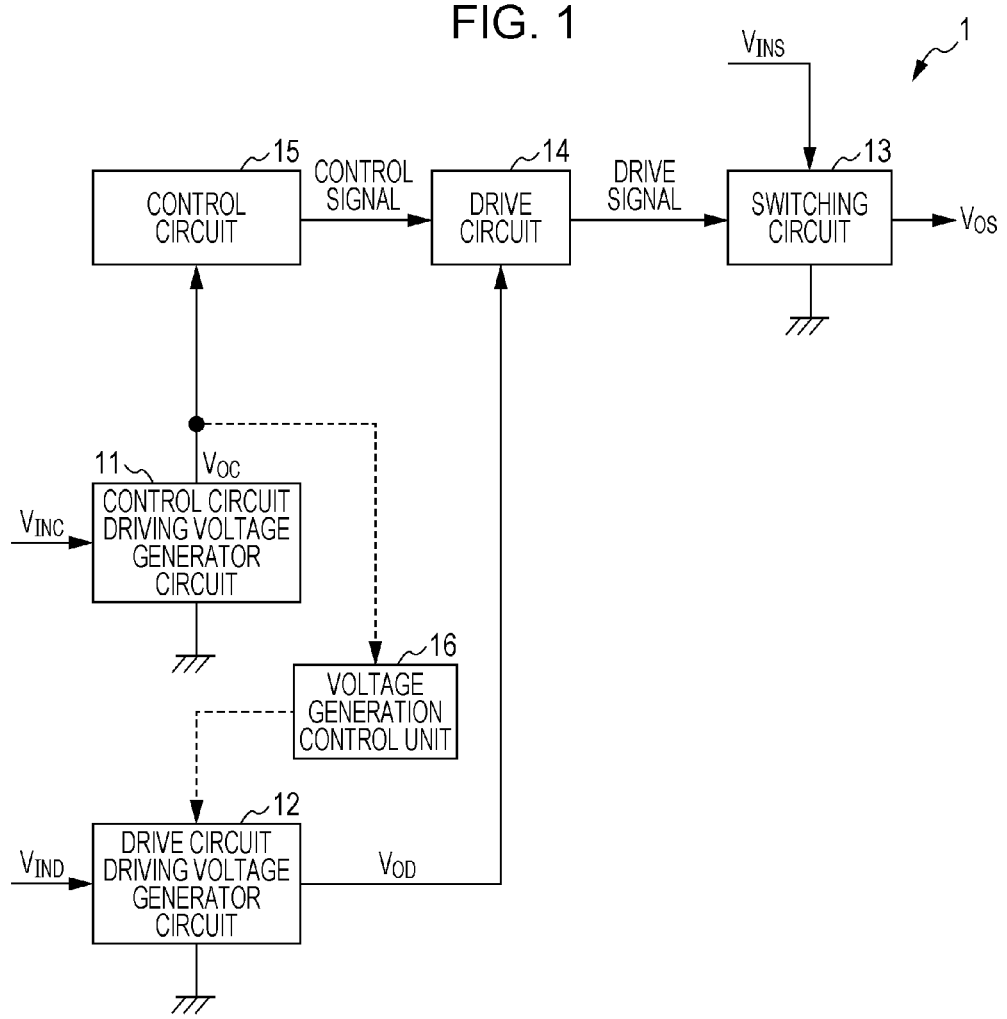
FIG. 1 is a schematic block diagram of a switching device according to a first embodiment of the present invention.

A first embodiment of the present invention will be described. FIG. 1 is a schematic block diagram of a switching device 1 according to the first embodiment. The switching device includes respective parts referenced by the characters 11 to 16.

The control circuit driving voltage generator circuit 11 (hereinafter abbreviated as the generator circuit 11), uses a control circuit power supply operation to generate a DC driving voltage $V_{OC}$ from an input voltage $V_{INC}$, for driving the control circuit 15. Herein, the input voltage $V_{INC}$ is considered to be a DC voltage, but it is also possible to make the input voltage $V_{INC}$ an AC voltage. The generator circuit 11 may be a step-up power supply circuit or a step-down power supply circuit. In this specification, unless specifically noted otherwise, an arbitrary voltage is taken to be a voltage as observed from a ground having a reference potential of 0 V (volts). Although $V_{OC}=0$ before activation of the power supply operation of the generator circuit 11, after activation of the power supply operation of the generator circuit 11, the driving voltage $V_{OC}$ rises towards a designated target voltage.

The drive circuit driving voltage generator circuit 12 (hereinafter abbreviated as the generator circuit 12), by a drive circuit power supply operation, generates from an input voltage $V_{IND}$ a DC driving voltage $V_{OD}$ for driving the drive circuit 14. Herein, the input voltage $V_{IND}$ is considered to be a DC voltage, but it is also possible to make the input voltage $V_{IND}$ an AC voltage. The generator circuit 12 may be a step-up power supply circuit or a step-down power supply circuit. Although $V_{OD}=0$ before activation of the power supply operation of the generator circuit 12, after activation of the power supply operation of the generator circuit 12, the driving voltage $V_{OD}$ rises towards a designated target voltage.

Whereas the drive circuit 14 requires a gate drive voltage (for example, 10 V to 15 V), the control circuit 15 for the drive circuit 14 requires a different voltage, which is ordinarily a lower voltage (for example, 3.3 V to 5 V). Consequently, the switching device 1 is provided with the two driving voltage generator circuits 11 and 12.

The switching circuit 13 includes one or more arbitrary switching elements, and generates an output voltage $V_{OS}$ from an input voltage $V_{INS}$ according to a switching operation that obeys a drive signal from the drive circuit 14. The switching circuit may also include additional circuit elements other than switching elements. During the switching operation, each switching element inside the switching circuit 13 is turned on or off in accordance with the drive signal from the drive circuit 14. A switching element in the switching circuit 13 may be a semiconductor switching element of arbitrary type, or a mechanical switching element (such as a relay). The semiconductor switching element may be a bipolar transistor, a field-effect transistor such as a metal-oxide semiconductor field-effect transistor (MOSFET), or an insulated-gate bipolar transistor (IGBT), for example.

Figure 2:
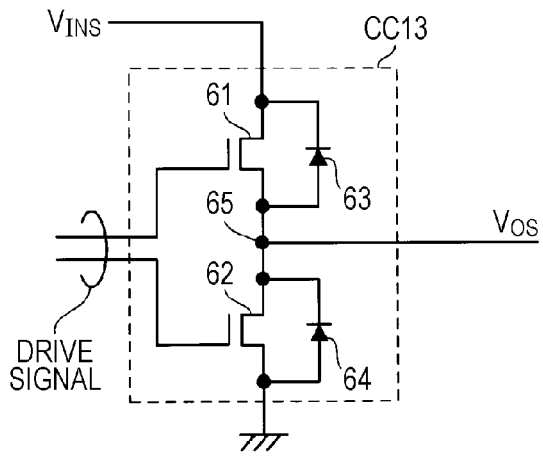
FIG. 2 is a diagram illustrating an exemplary internal configuration of the switching circuit in FIG. 1.

The switching circuit 13 may be any kind of switching circuit, but herein, the switching circuit 13 is considered to be the switching circuit CC13 in FIG. 2. The switching circuit CC13 is an inverter circuit that generates an AC output voltage $V_{OS}$ from a DC input voltage $V_{INS}$, and includes switching elements 61 and 62 connected to each other in series. In the example of FIG. 2, the switching elements 61 and 62 are n-channel metal-oxide semiconductor field-effect transistors (MOSFETs). Attached to the MOSFET 61 that acts as the high-side switch is a diode 63 whose forward direction points from the source to the drain of the MOSFET 61. Attached to the MOSFET 62 that acts as the low-side switch is a diode 64 whose forward direction points from the source to the drain of the MOSFET 62. The diodes 63 and 64 may be parasitic diodes of the MOSFETs 61 and 62, respectively.

The DC input voltage $V_{INS}$ ($V_{INS}>0$) is applied to the drain of the MOSFET 61, while the source of the MOSFET 62 is connected to ground. The source of the MOSFET 61 and the drain of the MOSFET 62 are commonly connected to a connection point 65. The drive signal output by the drive circuit 14 includes two signals that control the gate potential of the MOSFETs 61 and 62. By alternately turning on the MOSFETs 61 and 62 with the drive signal, an AC output voltage $V_{OS}$ is output from the connection point 65.

The drive circuit 14 is driven with the driving voltage $V_{OD}$, and by supplying to the switching circuit 13 a drive signal based on a control signal from the control circuit 15, turns each switching element inside the switching circuit 13 on or off. Note that before the driving of the drive circuit 14, the MOSFETs 61 and 62 in FIG. 2 are kept off. In the case where the switching elements are field-effect transistors such as MOSFETs, the drive circuit 14 is a gate driver that supplies a gate signal to the switching elements.

The control circuit 15 is driven with the driving voltage $V_{OC}$, generates a control signal, and supplies the control signal to the drive circuit 14.

Figure 3:
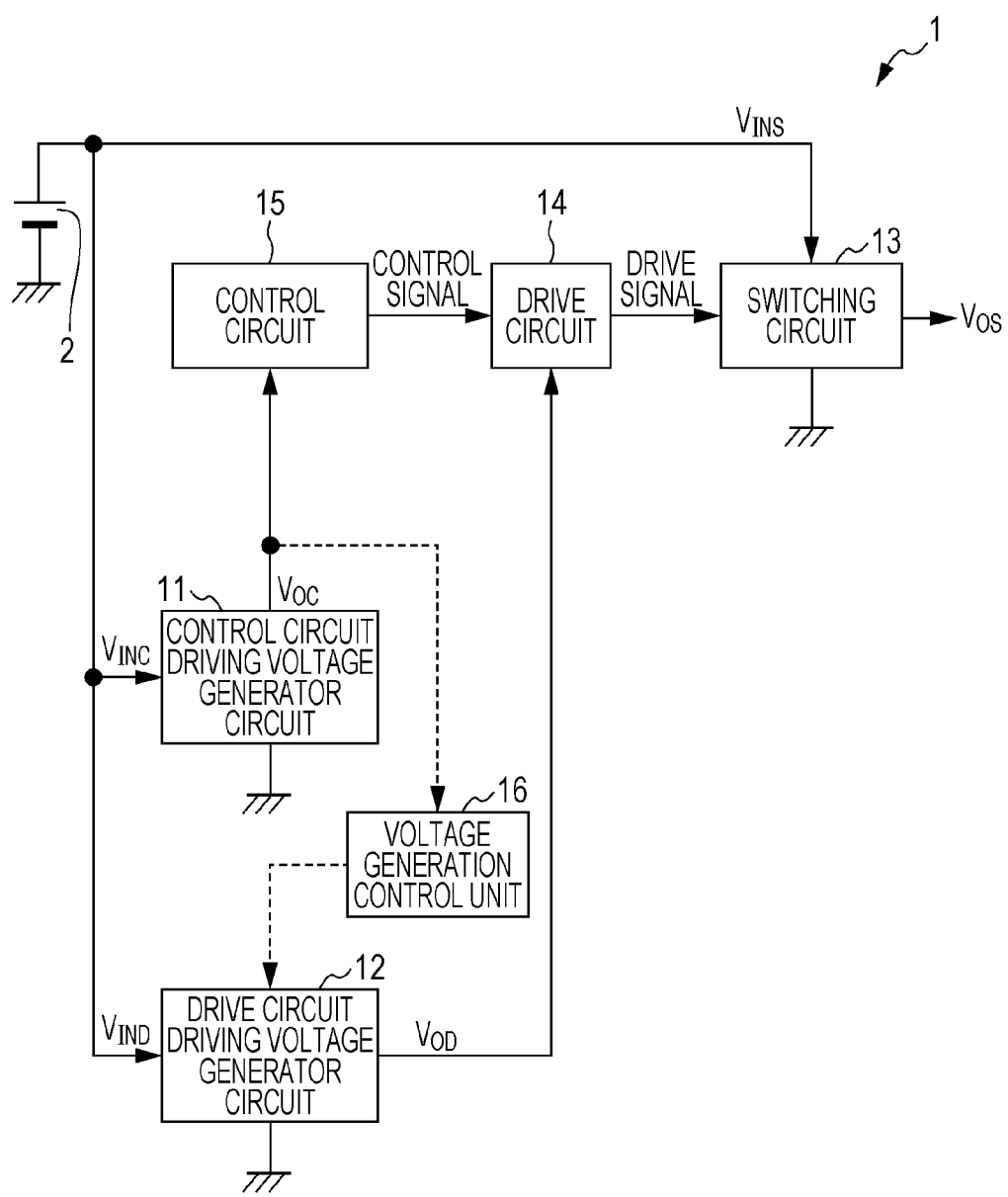
FIG. 3 is a diagram illustrating an exemplary relationship between a switching device and a voltage source (common voltage source), according to a first embodiment of the present invention.

The input voltages $V_{INC}$, $V_{IND}$, and $V_{INS}$ may be supplied from a common voltage source. In other words, for example, it is also possible to adopt a configuration in which the input voltages $V_{INC}$, $V_{IND}$, and $V_{INS}$ are supplied from a common voltage source 2, as illustrated in FIG. 3. In FIG. 3, the output voltage of the common voltage source 2 is supplied to the generator circuit 11, the generator circuit 12, and the switching circuit 13 as the input voltages $V_{INC}$, $V_{IND}$, and $V_{INS}$ (thus, $V_{INC}=V_{IND}=V_{INS}$).

Figure 4:
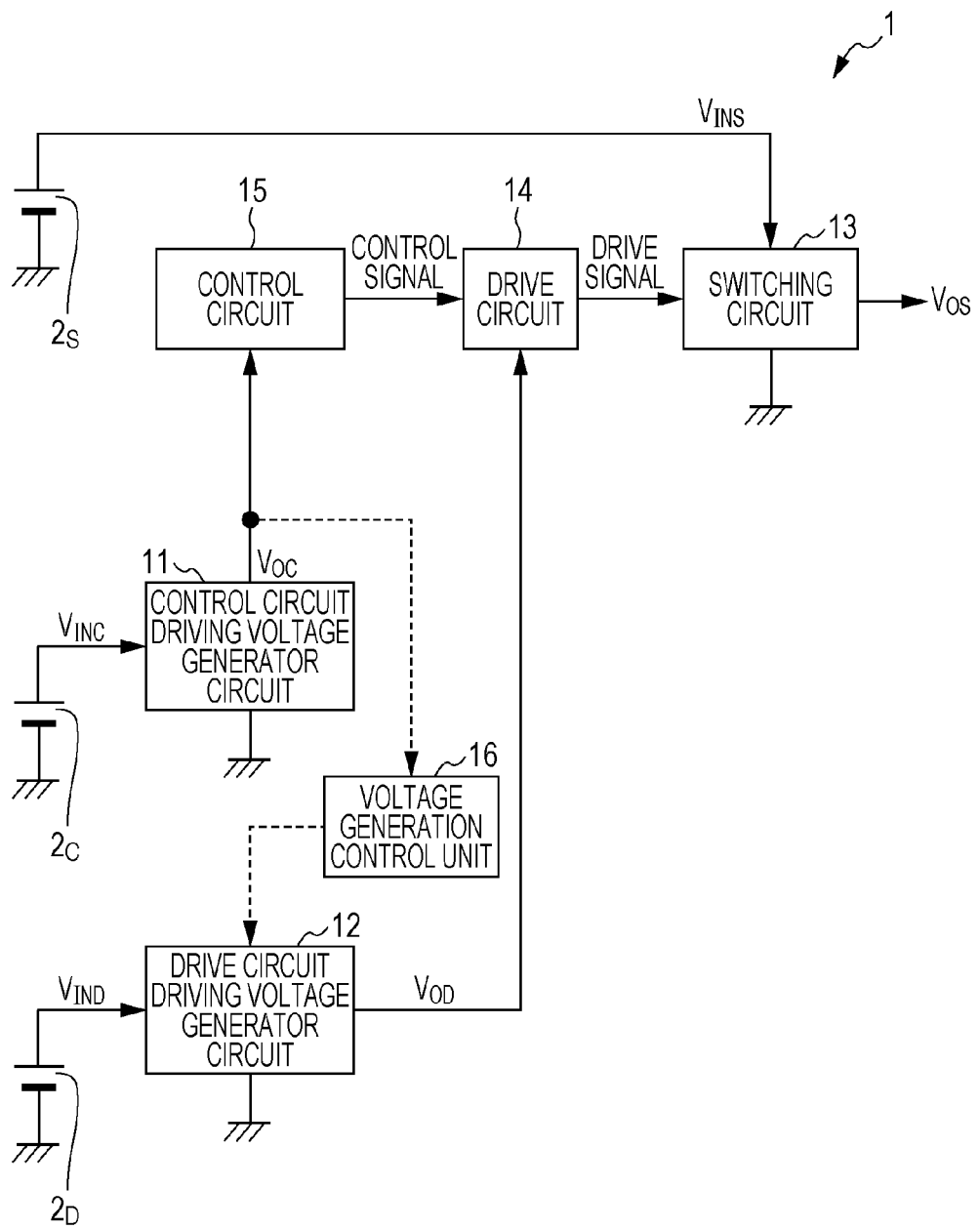
FIG. 4 is a diagram illustrating an exemplary relationship between a switching device and voltage sources (three voltage sources), according to a first embodiment of the present invention.

Alternatively, the input voltages $V_{INC}$, $V_{IND}$, and $V_{INS}$ may be supplied from mutually different voltage sources. In other words, for example, the input voltages $V_{INC}$, $V_{IND}$, and $V_{INS}$ may be supplied from the mutually different voltage sources $2_C$, $2_D$, and $2_S$, respectively, as illustrated in FIG. 4. In this case, the voltage values of the input voltage $V_{INC}$, $V_{IND}$, and $V_{INS}$ may be different from each other.

Alternatively, an arbitrary two input voltages from among the input voltages $V_{INC}$, $V_{IND}$, and $V_{INS}$ may be supplied from a first voltage source, whereas the one remaining input voltage may be supplied from a second voltage source (not illustrated). Herein, the second voltage source differs from the first voltage source.

The voltage sources 2, $2_S$, $2_C$, and $2_D$ may be solar cells (this applies similarly to the first and second voltage sources). A solar cell produces electric power based on sunlight, and outputs a DC voltage obtained by the electric power production. However, the voltage sources 2, $2_S$, $2_C$, and $2_D$ may also include an arbitrary energy source other than sunlight (such as fossil fuel, hydropower, wind power, or geothermal power) to output a DC voltage (this applies similarly to the first and second voltage sources). Alternatively, for example, the voltage sources 2, $2_S$, $2_C$, and $2_D$ may also be primary batteries such as alkaline batteries, or secondary batteries such as lithium-ion batteries (this applies similarly to the first and second voltage sources). In the following description, the input voltages $V_{INC}$, $V_{IND}$, and $V_{INS}$ are all taken to be positive DC voltages.

The control circuit 15 includes a microcontroller, logic circuit, or the like. When the voltage value of the driving voltage $V_{OC}$ output from the generator circuit 11 is smaller than a designated low threshold $V_{TH1}$, the activation and normal operation of the control circuit 15 is not guaranteed, but when the voltage value of the driving voltage $V_{OC}$ is equal to or greater than the low threshold $V_{TH1}$, the activation and normal operation of the control circuit 15 is ensured. Activation of the control circuit 15 refers to the transition from a state in which the control circuit 15 is not operating to a state in which the control circuit 15 may operate normally.

Before activation or during the activation operation of the control circuit 15, there is a risk that a signal of an indeterminate logic state will be added to the signal line that is supposed to carry the control signal. For example, during the activation operation, in a state in which a partial voltage not satisfying a designated voltage value is being applied to the control circuit 15, if part of the control circuit 15 is operating normally while another part is in an indeterminate logic state, there is a possibility that an incorrect control signal will be output during that time period. Consequently, if a significantly high driving voltage $V_{OD}$ is supplied hypothetically to the drive circuit 14 before activation or during the activation operation of the control circuit 15, there is a risk that the switching circuit 13 will malfunction (a switching element turning on or off unintentionally) in response to the input of the signal of indeterminate logic state. For example, there is a risk of causing the MOSFETs 61 and 62 in FIG. 2 to be turned on at the same time. Malfunction of the switching circuit 13 may cause a circuit element inside the switching circuit including the switching elements, or a peripheral element, to break or degrade.

Even if the input voltages $V_{INC}$, $V_{IND}$, and $V_{INS}$ are voltages supplied from the common voltage source 2 as illustrated in FIG. 3, depending on the circuit configuration and operation of the generator circuits 11 and 12, there is still a possibility that the driving voltage $V_{OD}$ may rise earlier than the driving voltage $V_{OC}$. Also, in the case of a circuit configuration like in FIG. 4, the input voltages $V_{INS}$ and $V_{IND}$ may also be supplied while the input voltage $V_{INC}$ is not being supplied. In these cases, it is necessary to avoid malfunction as described above. Accordingly, the switching device 1 is provided with a voltage generation controller 16.

The voltage generation controller 16 controls the generator circuit 12 so that the above drive circuit power supply operation is allowed (the start of the drive circuit power supply operation is allowed) after the activation of the control circuit 15. In other words, the voltage generation controller 16 prohibits execution of the drive circuit power supply operation before activation of the control circuit 15. The drive circuit power supply operation refers to the operation of generating the driving voltage $V_{OD}$ by the generator circuit 12. When execution of the drive circuit power supply operation is allowed in a state in which an input voltage $V_{IND}$ having a designated voltage value or greater is being supplied to the generator circuit 12, the generator circuit 12 starts execution of the drive circuit power supply operation. Consequently, the voltage generation controller 16 may also be said to control the generator circuit 12 so that the drive circuit power supply operation is started after activation of the control circuit 15 (this applies similarly to the voltage generation controller 16A discussed later).

To realize the above, the voltage generation controller 16 according to the first embodiment detects the voltage value of the driving voltage $V_{OC}$ which is the output voltage of the generator circuit 11, and after verifying that the voltage value of the driving voltage $V_{OC}$ is equal to or greater than a designated threshold $V_{TH2}$, allows execution of the drive circuit power supply operation (causes the drive circuit power supply operation to start). Herein, "$V_{TH2} \geq V_{TH1} > 0$" (in units of volts). When the voltage value of the driving voltage $V_{OC}$ is less than the designated threshold $V_{TH2}$, the voltage generation controller 16 does not allow execution of the drive circuit power supply operation. Note that the voltage for driving the voltage generation controller 16 is preferably the input voltage $V_{INC}$ or $V_{IND}$ (this applies similarly to the voltage generation controller 16A discussed later).

Before the start of execution of the drive circuit power supply operation, the output voltage of the generator circuit 12 is significantly low (normally 0 V), and a drive signal that turns on the MOSFETs 61 and 62 is not output from the drive circuit 14 (however, this ignores abnormal operation due to noise or the like). After the drive circuit power supply operation is started, the output voltage of the generator circuit 12 begins to rise from the significantly low voltage (normally 0 V), and stabilizes at a designated target voltage. While the output voltage of the generator circuit 12 (that is, $V_{OD}$) is stabilizing at the relevant target voltage, or when the output voltage of the generator circuit 12 (that is, $V_{OD}$) reaches a voltage slightly lower than the relevant target voltage, on-off control of the MOSFETs 61 and 62 by the drive circuit 14 becomes available.

According to the present embodiment, it becomes possible to reliably prevent malfunction of the switching circuit during activation of the switching device.

Second Embodiment

A second embodiment of the present invention will be described. The second embodiment, as well as the third to fifth embodiments discussed later, are based on the first embodiment, and regarding matters not specifically discussed in the second to fifth embodiments, the description of the first embodiment is also applicable to the second to fifth embodiments, unless specifically noted otherwise or the description is contradictory.

Figure 5:
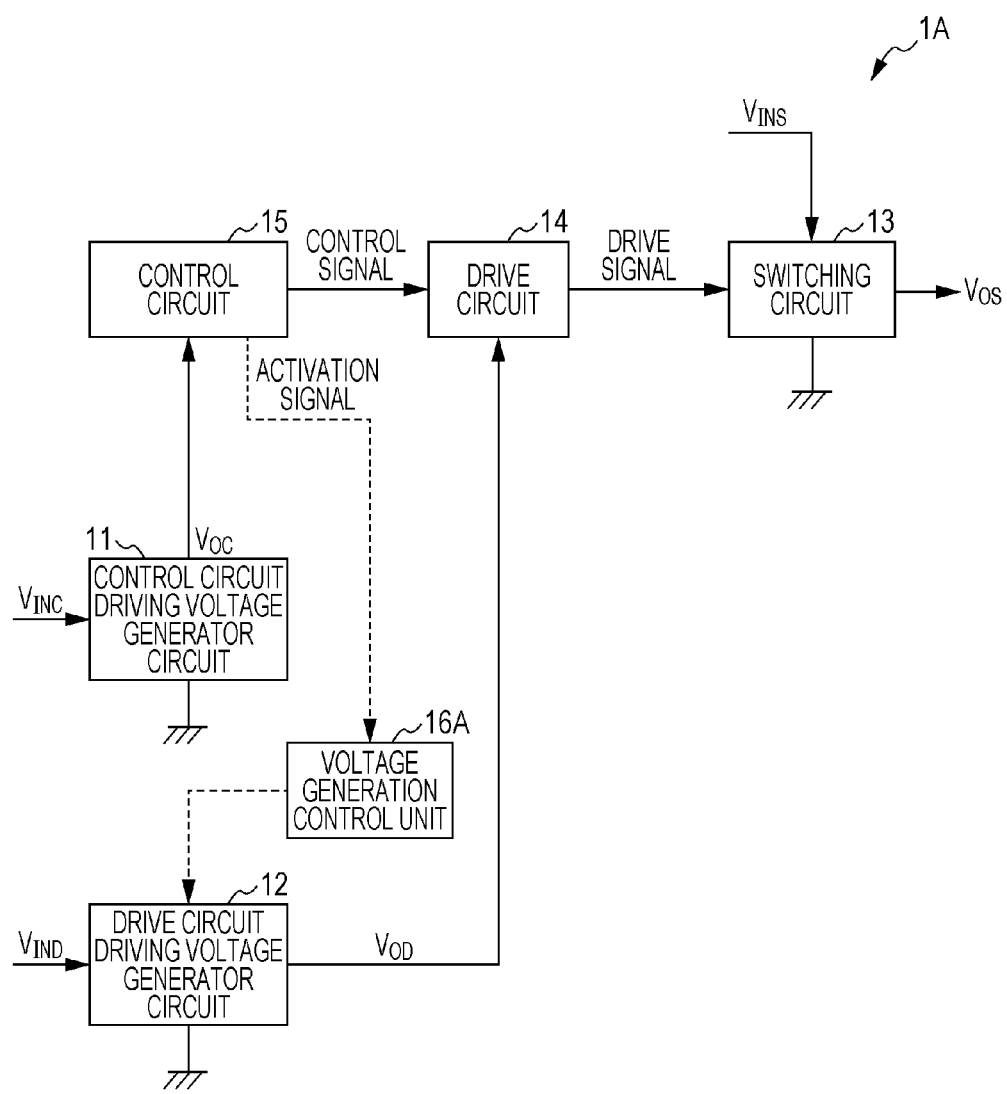
FIG. 5 is a schematic block diagram of a switching device according to a second embodiment of the present invention.

FIG. 5 is a schematic block diagram of a switching device 1A according to the second embodiment. The switching device 1A includes respective parts referenced by the characters 11 to 15 and 16A. In other words, the switching device 1A is formed by replacing the voltage generation controller 16 in the switching device 1 of the first embodiment with a voltage generation controller 16A.

The voltage generation controller 16A includes functions similar to the voltage generation controller 16 discussed in the first embodiment. Namely, the voltage generation controller 16A controls the generator circuit 12 so that the above drive circuit power supply operation is allowed (the start of the drive circuit power supply operation is allowed) after the activation of the control circuit 15. However, the voltage generation controller 16A does not make the allowance on the basis of the voltage value of the driving voltage $V_{OC}$, but instead makes the allowance on the basis of an activation signal generated by the control circuit 15 on the basis of the driving voltage $V_{OC}$.

The control circuit 15 is configured to output the activation signal after the activation of the control circuit 15 itself (not output the activation signal before activation). Consequently, the voltage generation controller 16A allows execution of the drive circuit power supply operation after verifying that the activation signal is being output from the control circuit 15. When the activation signal is not being output from the control circuit 15, the voltage generation controller 16 does not allow execution of the drive circuit power supply operation.

For example, the control circuit 15 outputs a low-level voltage signal, or a high-level voltage signal having a higher electric potential than the low level, from a specific terminal of the control circuit 15 itself, and the high-level voltage signal from the specific terminal functions as the activation signal. The voltage signal at the specific terminal is generated on the basis of the driving voltage $V_{OC}$, and the voltage value (voltage level) of the voltage signal does not exceed the voltage value of the driving voltage $V_{OC}$. It is sufficient for the voltage generation controller 16 to judge that the activation signal is being output from the control circuit 15 when the voltage signal from the above specific terminal has a voltage value equal to or greater than a designated value.

The second embodiment likewise makes it possible to reliably prevent malfunction of the switching circuit during activation of the switching device.

Third Embodiment

Figure 6:
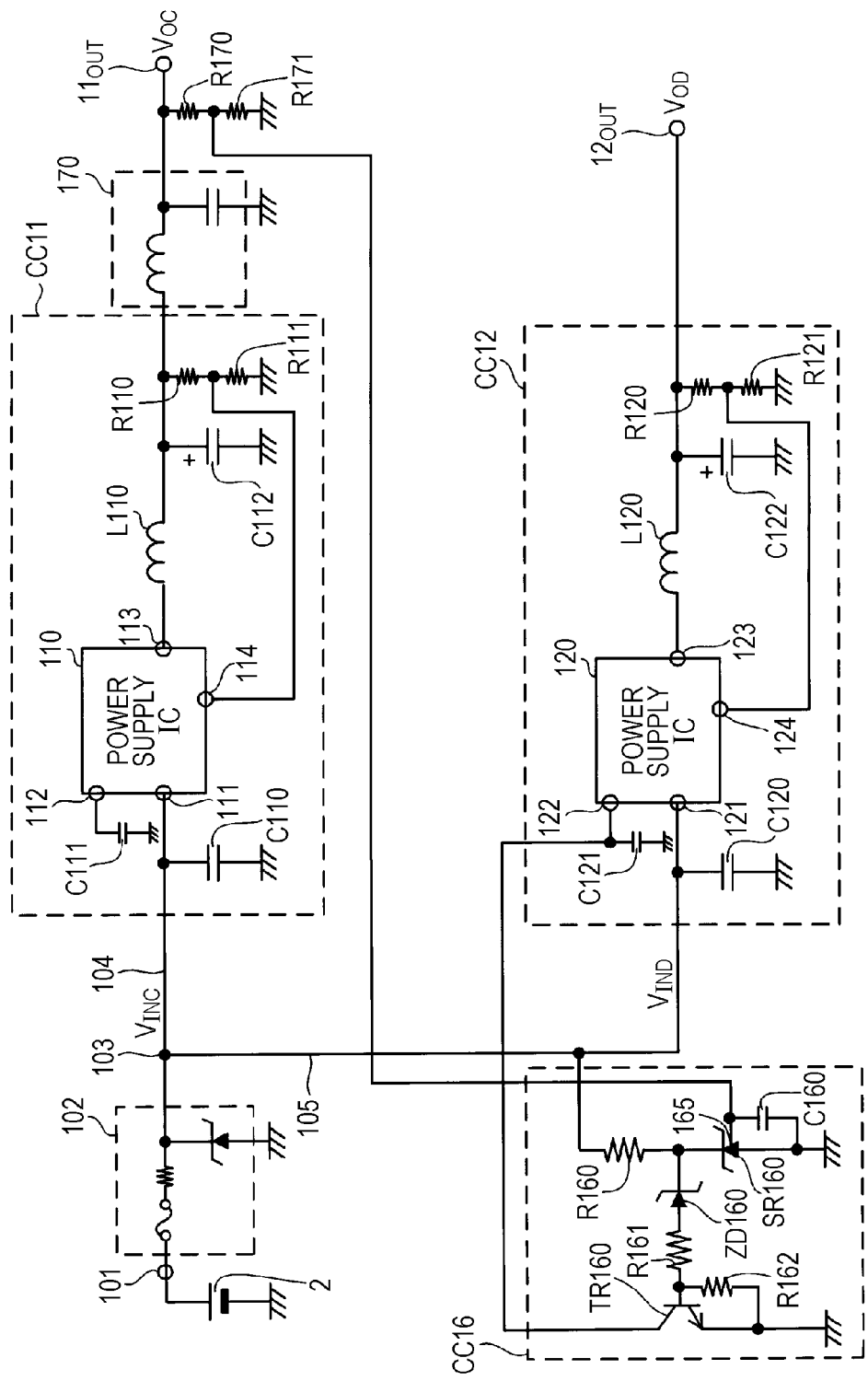
FIG. 6 is a partial circuit diagram of a switching device according to a third embodiment of the present invention.

A third embodiment of the present invention will be described. In the third embodiment, a specific circuit example of a switching device according to the present invention will be described. FIG. 6 is a specific partial circuit diagram of a switching device according to the present invention. The technology of the first embodiment is applied to the circuit in FIG. 6. Except for the voltage source 2, the respective parts illustrated in FIG. 6 are included in the structural elements of the switching device 1. In FIG. 6, the circuits CC11, CC12, and CC16 are examples of the generator circuit 11, the generator circuit 12, and the voltage generation controller 16, respectively.

The positive output terminal 101 of the voltage source 2 is connected to a connection point 103 as a branch point via a protection circuit 102 intended to provide overvoltage protection and the like to power supply ICs 110 and 120. Voltage input lines 104 and 105 are connected to the branch point 103. The negative output terminal of the voltage source 2 is connected to ground. The voltages applied to the voltage input lines 104 and 105 correspond to the input voltages $V_{INC}$ and $V_{IND}$, respectively.

The circuit CC11 includes a power supply IC 110 that forms a switching regulator, capacitors C110 to C112, an inductor L110, and voltage-dividing resistors R110 and R111. The power supply IC 110 includes an input terminal 111, a soft start (SS) terminal 112, an output terminal 113, and a feedback (FB) terminal 114. The capacitor C110 may also be multiple capacitors (this applies similarly to other capacitors). The inductor L110 may also be multiple inductors (this applies similarly to other inductors). The voltage-dividing resistor R110 may also be multiple resistors (this applies similarly to other resistors).

The voltage input line 104 is connected to the input terminal 111, and is also connected to ground via the capacitor C110. The output terminal 113 is connected to the positive pole of the output capacitor C112 via the inductor L110, while the negative pole of the output capacitor C112 is connected to ground. The voltage imparted to the output capacitor C112 is applied to the series circuit of the voltage-dividing resistors R110 and R111. More specifically, the positive pole of the output capacitor C112 is connected to a first end of the voltage-dividing resistor R110, while the other end of the voltage-dividing resistor R110 is connected to ground via the voltage-dividing resistor R111. Additionally, the connection point between the voltage-dividing resistors R110 and R111 is connected to the FB terminal 114. The power supply IC 110 switches the input voltage into the input terminal 111 using pulse-width modulation or the like so that the voltage at the FB terminal 114 matches a designated first reference voltage, and outputs the voltage obtained by such switching from the output terminal 113. The AC component of the voltage at the output terminal 113 is reduced by a low-pass filter that includes the inductor L110 and the output capacitor C112.

The voltage imparted to the output capacitor C112 is connected to a terminal $11_{OUT}$, which is the output terminal of the generator circuit 11, via another low-pass filter 170, and the driving voltage $V_{OC}$ for the control circuit 15 is output from the output terminal $11_{OUT}$. Thus, by appropriately providing the resistance values of the voltage-dividing resistors R110 and R111, the voltage value of the driving voltage $V_{OC}$ is able to stabilize at a desired first target voltage (for example, 3.3 V). Note that the low-pass filter 170 may be omitted.

In addition, in the power supply IC 110, when a voltage equal to or greater than a designated voltage value is being applied to the input terminal 111, a current (for example, a constant current) is supplied in the direction from the input terminal 111 to the SS terminal 112. This current charges the capacitor C111 provided between the SS terminal 112 and ground. The power supply IC 110 uses the voltage of the SS terminal 112 to perform a soft start operation. In other words, when the voltage of the SS terminal 112 starts rising from an initial point of 0 V, the power supply IC 110 causes the above first reference voltage to rise from 0 V so that the voltage of the FB terminal 114 rises as the voltage of the SS terminal 112 rises. Once the first reference voltage reaches a designated first reference value, the power supply IC 110 stops the rise of the first reference voltage to end the soft start operation. When the voltage value of the first reference voltage matches the first reference value, the driving voltage $V_{OC}$ matches (ignoring error) the first target voltage (for example, 3.3 V).

The circuit CC12 includes a power supply IC 120 that forms a switching regulator, capacitors C120 to C122, an inductor L120, and voltage-dividing resistors R120 and R121. The power supply IC 120 includes an input terminal 121, a soft start (SS) terminal 122, an output terminal 123, and a feedback (FB) terminal 124.

The voltage input line 105 is connected to the input terminal 121, and is also connected to ground via the capacitor C120. The output terminal 123 is connected to the positive pole of the output capacitor C122 via the inductor L120, while the negative pole of the output capacitor C122 is connected to ground. The voltage imparted to the output capacitor C122 is applied to the series circuit of the voltage-dividing resistors R120 and R121. More specifically, the positive pole of the output capacitor C122 is connected to a first end of the voltage-dividing resistor R120, while the other end of the voltage-dividing resistor R120 is connected to ground via the voltage-dividing resistor R121. Additionally, the connection point between the voltage-dividing resistors R120 and R121 is connected to the FB terminal 124. The power supply IC 120 switches the input voltage into the input terminal 121 using pulse-width modulation or the like so that the voltage at the FB terminal 124 matches a designated second reference voltage, and outputs the voltage obtained by such switching from the output terminal 123. The AC component of the voltage at the output terminal 123 is reduced by a low-pass filter that includes the inductor L120 and the output capacitor C122.

The voltage imparted to the output capacitor C122 is connected to a terminal $12_{OUT}$, which is the output terminal of the generator circuit 12, and the driving voltage $V_{OD}$ for the drive circuit 14 is output from the output terminal $12_{OUT}$. Thus, by appropriately providing the resistance values of the voltage-dividing resistors R120 and R121, the voltage value of the driving voltage $V_{OD}$ is able to stabilize at a desired second target voltage (for example, 15 V).

In addition, in the power supply IC 120, when a voltage equal to or greater than a designated voltage value is being applied to the input terminal 121, a current (for example, a constant current) is supplied in the direction from the input terminal 121 to the SS terminal 122. While a transistor TR160, which is discussed later, is off, this current charges the capacitor C121 provided between the SS terminal 122 and ground. The power supply IC 120 uses the voltage of the SS terminal 122 to perform a soft start operation. In other words, when the voltage of the SS terminal 122 starts rising from an initial point of 0 V, the power supply IC 120 causes the above second reference voltage to rise from 0 V so that the voltage of the FB terminal 124 rises as the voltage of the SS terminal 122 rises. Once the second reference voltage reaches a designated second reference value, the power supply IC 120 stops the rise of the second reference voltage to end the soft start operation. When the voltage value of the second reference voltage matches the second reference value, the driving voltage $V_{OD}$ matches (ignoring error) the second target voltage (for example, 15 V).

The circuit CC16 includes a transistor TR160 which is an NPN bipolar transistor, resistors R160 and R162, a Zener diode ZD160, a reference terminal 165, a shunt regulator SR160 including an anode and a cathode, and a capacitor C160. The output terminal 11$_{OUT}$ is connected to a first end of a voltage-dividing resistor R170, while the other end of the voltage-dividing resistor R170 is connected to ground via a voltage-dividing resistor R171. The connection point between the voltage-dividing resistors R170 and R171 is connected to the reference terminal 165, and is also connected to ground via the capacitor C160. In other words, a voltage corresponding to the driving voltage $V_{OC}$ is input into the reference terminal 165 through the voltage-dividing resistors R170 and R171. The voltage-dividing resistors R170 and R171 may also be considered to be included in the structural elements of the circuit CC16.

The anode of the shunt regulator SR160 is connected to ground. The cathode of the shunt regulator SR160 is connected to the cathode of the Zener diode ZD160, and is also connected to the voltage input line 105 (and 104) via the resistor R160. The anode of the Zener diode ZD160 is connected to the base of the transistor TR160 via the resistor R161. Also, in the transistor TR160, the base is connected to the emitter via the resistor R162, the emitter is connected to ground, and the collector is connected to the SS terminal 122.

When the voltage at the reference terminal 165 is less than a third reference voltage (for example, 2.88 V), the shunt regulator SR160 makes the pathway between its anode and cathode non-conductive. As a result, a base current is supplied from the voltage input line 105, through the resistor R160 and the Zener diode ZD160, to the transistor TR160, and the transistor TR160 which functions as a switch turns on. Subsequently, the voltage of the SS terminal 122 is lowered to a voltage close to 0 V, and the voltage of the output terminal 12$_{OUT}$ does not rise from 0 V even if the input voltage $V_{IND}$ is significantly high. In other words, when the voltage at the reference terminal 165 is less than a designated third reference voltage, execution of the drive circuit power supply operation is prohibited (the drive circuit power supply operation is not started).

On the other hand, if the voltage at the reference terminal 165 becomes equal to or greater than the third reference voltage, the shunt regulator SR160 makes the pathway between its anode and cathode conductive. As a result, the cathode potential of the shunt regulator SR160 drops significantly, the base current is no longer supplied to the transistor TR160 via the Zener diode ZD160, and the transistor TR160 turns off. As the transistor TR160 turns off, the capacitor C121 starts charging, and the soft start operation in the power supply IC 120 is started. Because of the start of the soft start operation, the output voltage $V_{OD}$ of the circuit CC12 starts rising towards the second target voltage (for example, 15 V), and ultimately stabilizes at the second target voltage. In this way, when the voltage at the reference terminal 165 is equal to or greater than the designated third reference voltage, execution of the drive circuit power supply operation is allowed.

According to the circuit configuration in FIG. 6, the effects and advantages discussed in the first embodiment are realized. Additionally, the circuit CC16 for detecting the output voltage of the circuit CC11 is driven using the input voltages of the circuits CC11 and CC12 ($V_{INC}$ and $V_{IND}$). Consequently, the detection of a desired voltage in the circuit CC11 is possible before the voltages for driving the control circuit 15 and the drive circuit 14 are generated.

Fourth Embodiment

Figure 7:
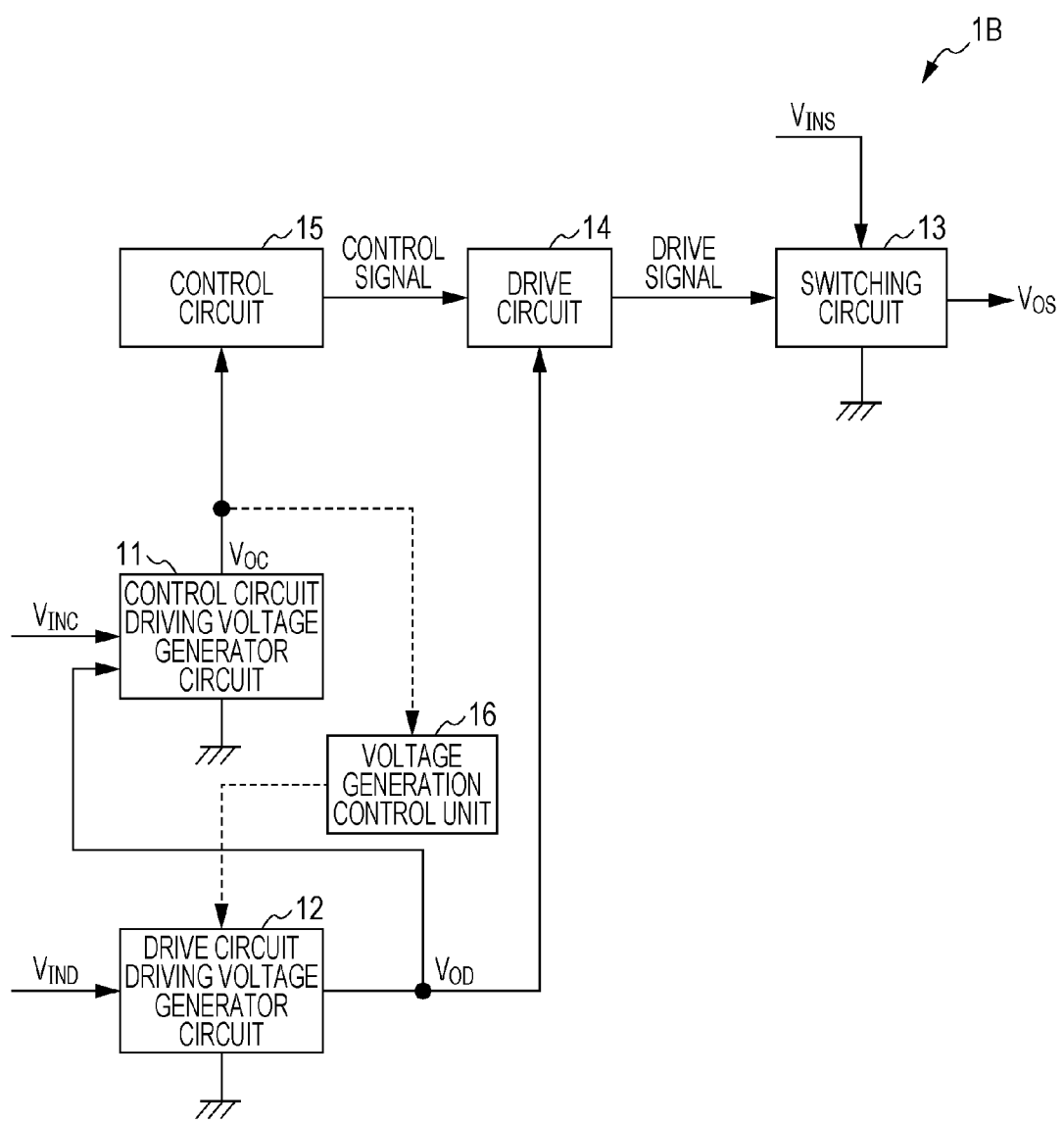
FIG. 7 is a schematic block diagram of a switching device according to a fourth embodiment of the present invention.

A fourth embodiment of the present invention will be described. FIG. 7 is a schematic block diagram of a switching device 1B according to the fourth embodiment. The switching device 1B includes respective parts referenced by the characters 11 to 16, similarly to the switching device 1 of FIG. 1. However, in the switching device 1B, the voltage generation controller 16 may also be replaced by the voltage generation controller 16A according to the second embodiment (FIG. 5). The function and operation of each part in the switching device 1B are similar to those of the switching device 1 or 1A.

Figure 8:
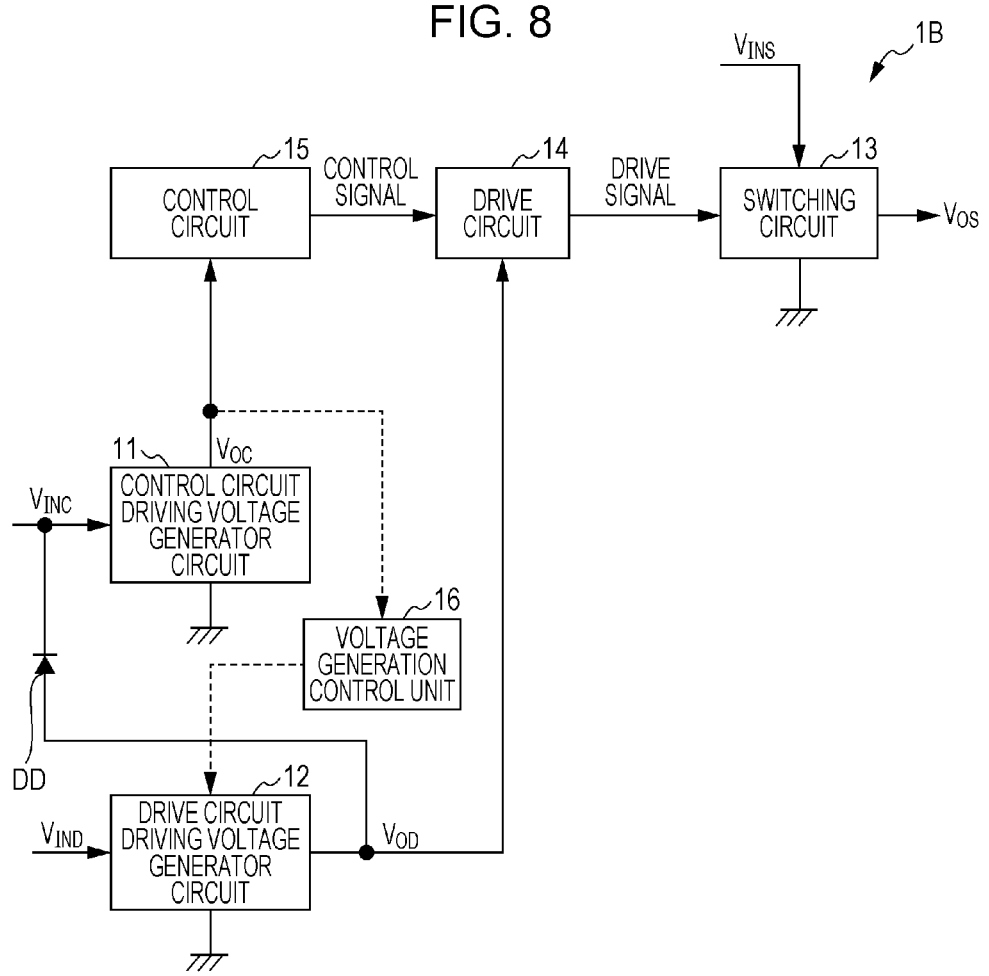
FIG. 8 is a schematic block diagram of a switching device according to a fourth embodiment of the present invention.

However, the generator circuit 11 in the switching device 1B is capable of generating the voltage $V_{OC}$ using the input voltage $V_{INC}$ or the output voltage $V_{OD}$ of the generator circuit 12. Specifically, for example, the generator circuit 11 generates the voltage $V_{OC}$ using the input voltage $V_{INC}$ and without using the output voltage $V_{OD}$ when the relationship "$V_{INC}+\Delta > V_{OD}$" is established, and generates the voltage $V_{OC}$ using the output voltage $V_{OD}$ when the relationship "$V_{INC}+\Delta \leq V_{OD}$" is established. The voltage quantity $\Delta$ may be zero, or an arbitrary positive value other than zero. As illustrated in FIG. 8, it is possible to adopt a configuration that connects, via a diode DD, the output terminal of the generator circuit 12 from which the voltage $V_{OD}$ is output to the input terminal of the generator circuit 11 that receives the input voltage $V_{INC}$. With this configuration, the voltage quantity $\Delta$ corresponds to the voltage drop across the diode DD (FIG. 12, discussed later, corresponds to a specific circuit example of the configuration in FIG. 8).

Figure 9:
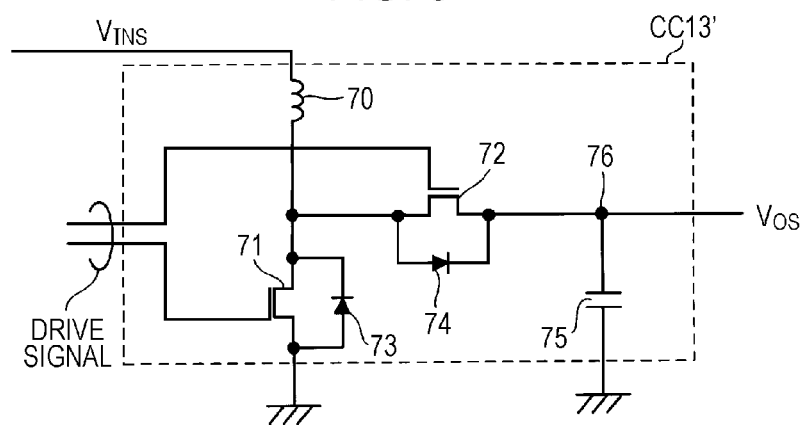
FIG. 9 is a diagram illustrating an exemplary internal configuration of the switching circuit in FIG. 7.

FIG. 9 illustrates a switching circuit CC13' as an example of the switching circuit 13. However, as discussed above, the switching circuit 13 may be any type of switching circuit. The switching circuit CC13' is applicable to all embodiments, and the switching circuit CC13 in FIG. 2 likewise is applicable to all embodiments.

The switching circuit CC13' is a synchronous rectification step-up chopper that raises a DC input voltage $V_{INS}$ to obtain a DC output voltage $V_{OS}$, and includes an inductor 70, switching elements 71 and 72, and an output capacitor 75. In the example of FIG. 9, the switching elements 71 and 72 are re-channel MOSFETs. The input voltage $V_{INS}$ is applied to a first end of the inductor 70. The other end of the inductor 70 is jointly connected to the drain of the MOSFET 71 which acts as a low-side switch, and the source of the MOSFET 72 which acts as a high-side (synchronous rectification) switch. Attached to the MOSFETs and 72 are diodes 73 and 74, respectively, whose forward direction points from the source to the drain. The diodes 73 and may be parasitic diodes of the MOSFETs 71 and 72, respectively. The source of the MOSFET 71 is connected to ground. The drain of the MOSFET 72 is connected to the positive pole of the output capacitor 75 by a connection point 76, while the negative pole of the output capacitor 75 is connected to ground. The drive signal output by the drive circuit 14 includes two signals that control the gate potential of the MOSFETs 71 and 72. By alternately turning on the MOSFETs 71 and 72 with the drive signal, a DC output voltage $V_{OS}$ is output from the connection point 76. Note that before the driving of the drive circuit 14, the MOSFETs 71 and 72 are kept off.

Figure 10:
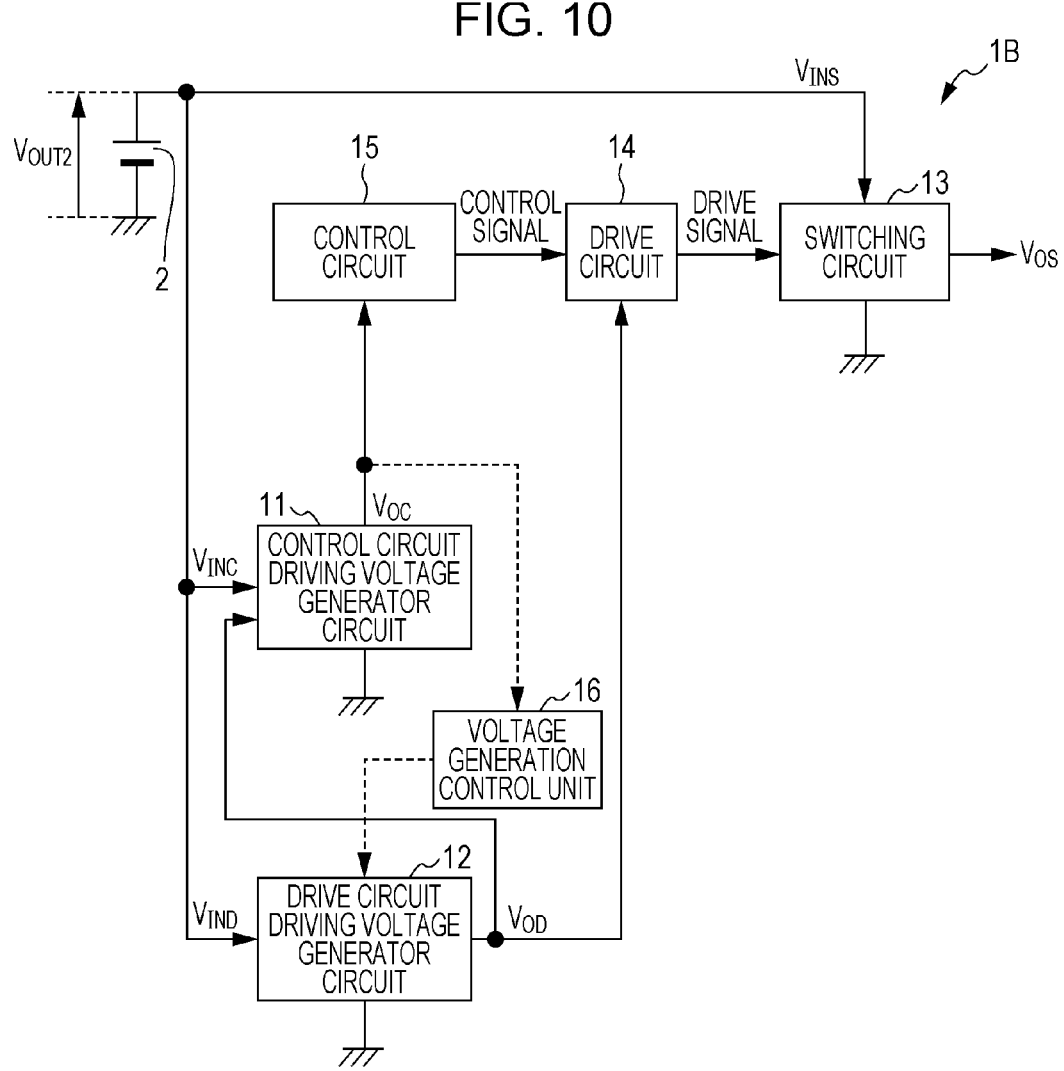
FIG. 10 is a diagram illustrating an exemplary relationship between a switching device and a voltage source (common voltage source), according to a fourth embodiment of the present invention.
Figure 11:
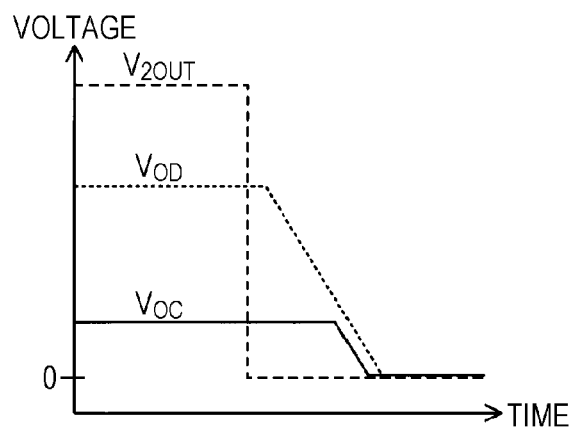
FIG. 11 is a diagram illustrating a relationship between the output of a voltage source and a generated driving voltage, according to a fourth embodiment of the present invention.

As discussed in the first embodiment, and likewise in the present embodiment, the input voltages $V_{INC}$, $V_{IND}$, and $V_{INS}$ may be supplied from mutually different voltage sources, but at this point, consider the case in which the input voltages $V_{INC}$, $V_{IND}$, and $V_{INS}$ are supplied from a common voltage source 2, as illustrated in FIG. 10. Suppose that the output of the voltage source 2 stops at a certain timing based on a state in which a significantly high voltage $V_{2OUT}$ is being supplied from the voltage source 2 as the input voltages $V_{INC}$, $V_{IND}$, and $V_{INS}$, and the voltages $V_{OC}$ and $V_{OD}$ have stabilized at the first and second target voltages (for example, 3.3 V and 15 V) (see FIG. 11). Subsequently, taking the relevant timing as the starting point, the output voltage $V_{OD}$ of the generator circuit 12 begins to fall, but during the period in which the output voltage $V_{OD}$ is equal to or greater than a designated voltage smaller than the second target voltage, the control circuit power supply operation in the generator circuit 11 is maintained, and the driving voltage $V_{OC}$ of the control circuit 15 stays at the first target voltage. Subsequently, after the voltage $V_{OD}$ drops significantly, the output voltage $V_{OC}$ of the generator circuit 11 falls.

In other words, the control circuit 15 becomes able to control the drive circuit 14 correctly until the operation of the drive circuit 14 stops, and malfunction of the switching circuit 13 can be prevented. Note that, although not illustrated in FIG. 10 and the like, it is preferable to provide an output capacitor in the generator circuit 12, and supply power for driving the generator circuit 11 from the output capacitor (the capacitor C122 in FIG. 12 corresponds to this output capacitor).

If the driving voltage $V_{OC}$ for the control circuit 15 falls before the driving voltage $V_{OD}$ of the drive circuit 14, during the process a signal of indeterminate logic state may be added to the signal line that is supposed to carry the control signal. As a result, there is a risk that malfunction (a switching element turning on or off unintentionally) may occur in the switching circuit 13. Malfunction of the switching circuit 13 may cause a circuit element inside the switching circuit including the switching elements, or a peripheral element, to break or degrade. For example, if the MOSFETs 71 and turn on at the same time due to a malfunction while in a state of accumulated electric charge in the output capacitor 75 in FIG. 9, a shoot-through current may be produced from the output capacitor 75 through the MOSFETs 72 and 71, and breakage of circuit elements or the like may occur.

If a configuration like the present embodiment is adopted, it becomes possible to moderate or eliminate malfunction of the switching circuit that may occur when the supply of the input voltage $V_{INC}$ is stopped or reduced.

Note that the cause of the stopped or reduced supply of the input voltage $V_{INC}$ is arbitrary. For example, when the voltage source 2 or $2_C$ (see FIG. 10 or FIG. 4) is a solar cell, the supply of the input voltage $V_{INC}$ may be stopped or reduced due to blocked sunlight or the like. As another example, when the connection between the voltage source 2 or $2_C$ and the generator circuit 11 is cut off, the supply of the input voltage $V_{INC}$ stops. The cutoff of the connection in this case may occur because of the turning off of a switch disposed between the voltage source 2 or $2_C$ and the generator circuit 11, or because of a break or the like in the wiring between the voltage source 2 or $2_C$ and the generator circuit 11. As another example, when the voltage source 2 or $2_C$ is a battery such as a primary battery or a secondary battery, the supply of the input voltage $V_{INC}$ stops when the battery is removed from the device, or when the connection between the battery and the generator circuit 11 is cut off.

Fifth Embodiment

Figure 12:
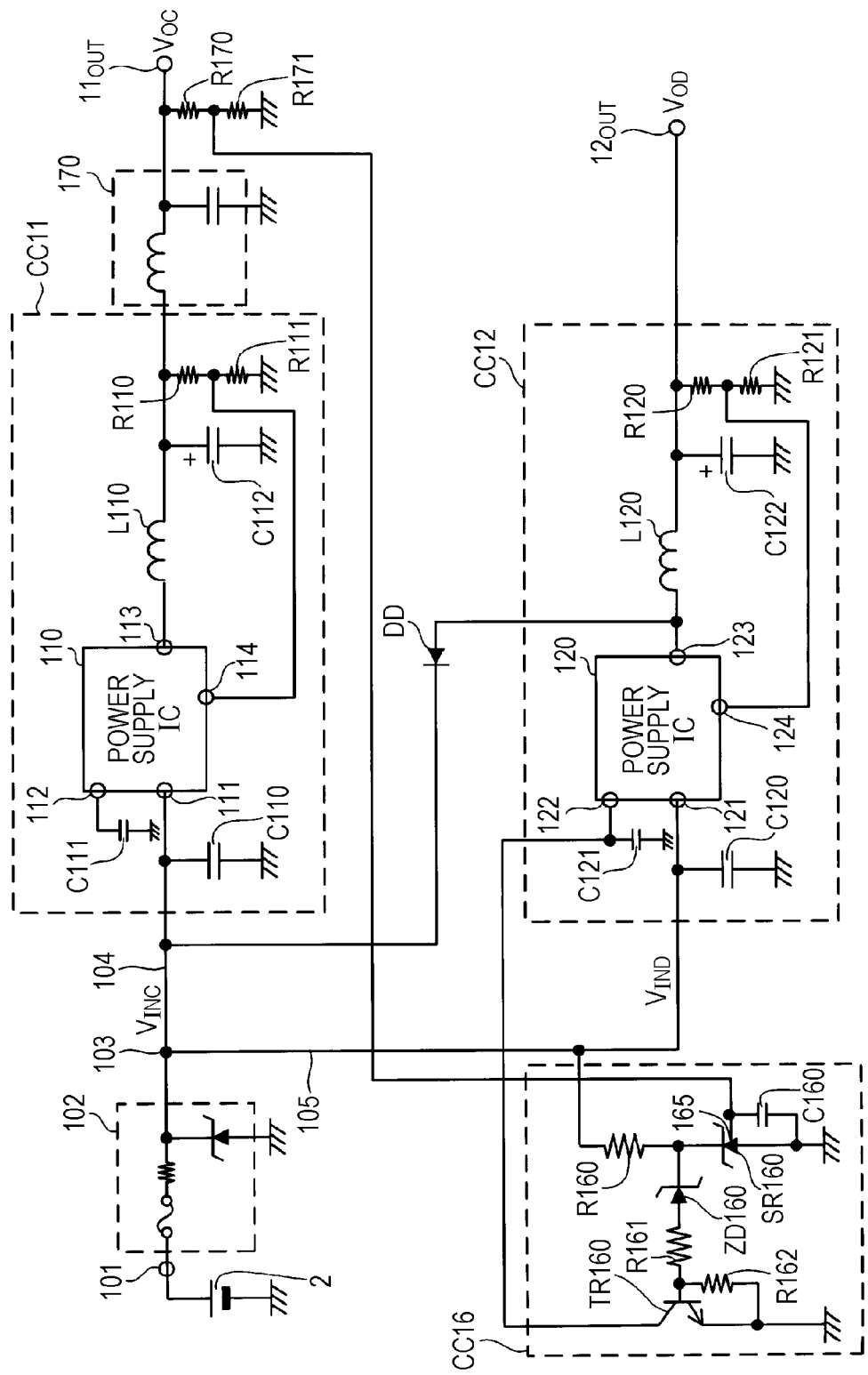
FIG. 12 is a partial circuit diagram of a switching device according to a fifth embodiment of the present invention.
Figure 13:
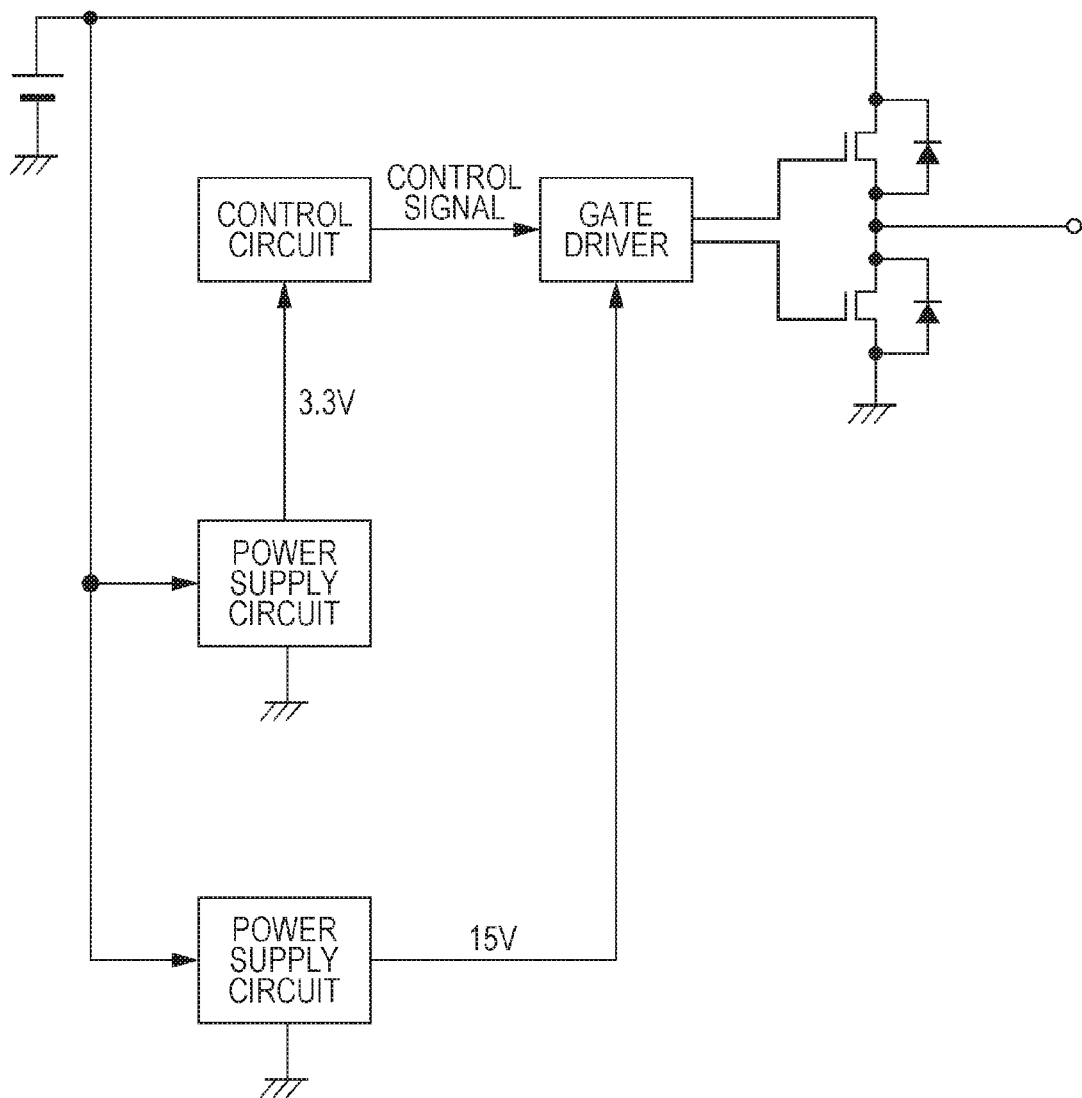
FIG. 13 is a diagram illustrating a configuration of a conventional switching device.

A fifth embodiment of the present invention will be described. FIG. 12 is a specific partial circuit diagram of a switching device according to the present invention. The technologies of the first and fourth embodiments are applied to the circuit in FIG. 12. Except for the voltage source 2, the respective parts illustrated in FIG. 12 are included in the structural elements of the switching device 1B. The circuit of FIG. 12 is obtained by adding a diode DD to the circuit of FIG. 6. The diode DD may also be multiple diodes. Since the circuit of FIG. 12 is similar to the circuit of FIG. 6 except for the addition of the diode DD, description of the same circuit portions will be omitted. However, in FIG. 12, the circuit CC12 is limited to a step-down power supply circuit.

In the diode DD, the anode is connected to the output terminal 123 of the power supply IC 120, while the cathode is connected to the voltage input line 104 (and thus also connected to the voltage input line 105). However, the anode of the diode DD may also be connected to the positive pole of the output capacitor C122. The voltage on the line between the output terminal 123 and the inductor L120 includes a large switching component, but this line is also a type of line to which the output voltage of the generator circuit 12 is added, similarly to the line between the inductor L120 and the terminal $12_{OUT}$. When the input voltage $V_{INC}$ becomes lower than the voltage obtained by subtracting the voltage drop across the diode DD from the output voltage $V_{OD}$ of the circuit CC12 (the voltage of the output capacitor C122), the output voltage $V_{OD}$ of the circuit CC12 (the voltage of the output capacitor C122) is added to the voltage input line 104 via the diode DD.

In the circuit of FIG. 12, suppose that the output of the voltage source 2 stops at a certain timing. Subsequently, operation of the power supply IC 120 stops, and taking the relevant timing as a starting point, the output voltage $V_{OD}$ of the circuit CC12 begins to fall (begins to fall from 15 V, for example). However, on the other hand, since power is supplied to the input terminal 111 of the power supply IC 110 from the output capacitor C122 through the diode DD, during the period in which the voltage $V_{OD}$ is equal to or greater than a designated voltage (for example, 4 V) that is smaller than the second target voltage (for example, 15 V), normal operation of the power supply IC 110 is maintained, and the normal driving voltage $V_{OC}$ (for example 3.3 V) continues to be supplied to the control circuit 15. After that, if the voltage $V_{OD}$ falls significantly, the voltage $V_{OC}$ also falls, but at this stage, it is anticipated that operation of the drive circuit 14 has stopped, and thus a malfunction of the switching circuit 13 is avoided.

Note that in the case in which the voltage source 2 is a solar cell, when the output of the voltage source 2 stops due to blocked sunshine or the like, even if the voltage of the output capacitor C122 is applied to the voltage input line 104 through the diode DD, only a reflux current approximately equal to a leakage current is produced, and a problematic amount of the reflux current (current from the output capacitor C122 to the voltage source 2) is not thought to occur. However, a backflow prevention diode for preventing a reflux current between the terminal 101 and the connection point 103 may also be added. Additionally, the problem of backflow does not occur when a switch (not illustrated) provided between the voltage source 2 and the connection point 103 is off, or when a battery that acts as the voltage source 2 is removed.

<Consideration of Content of Invention>

Hereinafter, the content of the present invention will be considered.

A switching device (1, 1A, 1B) according to an aspect of the present invention includes: a switching circuit (13) including a switching element; a first driving voltage generator circuit (11) that generates a first driving voltage ($V_{OC}$) on the basis of a first input voltage ($V_{INC}$); a second driving voltage generator circuit (12) that generates a second driving voltage ($V_{OD}$) on the basis of a second input voltage ($V_{IND}$); a control circuit (15), driven by the first driving voltage, that generates a control signal; a drive circuit (14), driven by the second driving voltage, that turns the switching element on or off by supplying to the switching element a drive signal based on the control signal; and a voltage controller (16, 16A) that controls the second driving voltage generator circuit so that an operation of generating the second driving voltage by the second driving voltage generator circuit is allowed after activation of the control circuit.

If the second driving voltage is generated and the drive circuit starts driving before activation of the control circuit, a malfunction (a switching element turning on or off unintentionally) may occur in the switching circuit. By providing the above voltage generation controller, malfunction of the switching circuit during activation of the switching device is moderated.

Specifically, for example, the voltage generation controller (16, 16A) may perform operational control of the second driving voltage generator circuit (12) on the basis of the voltage value of the first driving voltage ($V_{OC}$), or an activation signal generated by the control circuit (15) on the basis of the first driving voltage.

Consequently, a function of allowing the operation of generating the second driving voltage after activation of the control circuit is realized with a simple configuration.

Additionally, for example, the voltage generation controller (16, 16A) may allow the operation of generating the second driving voltage ($V_{OD}$) by the second driving voltage generator circuit (12) when the voltage value of the first driving voltage ($V_{OC}$) becomes equal to or greater than a designated threshold value, or when the activation signal is supplied from the control circuit.

Consequently, a function of allowing the operation of generating the second driving voltage after activation of the control circuit is realized reliably.

Additionally, for example, the first driving voltage generator circuit (11) may be formed to be capable of generating the first driving voltage ($V_{OC}$) by using the first input voltage ($V_{INC}$) or the second driving voltage ($V_{OD}$) output from the second driving voltage generator circuit (12).

Consequently, for example, it becomes possible to generate the first driving voltage using the second driving voltage when the supply of the first input voltage has stopped or the like. As a result, a situation in which the drive circuit drives while the control circuit is not in a normal operating state is avoided, and malfunction of the switching circuit when the supply of the first input voltage has stopped or the like is moderated.

Specifically, for example, the switching device additionally includes a diode (DD) provided between a voltage input line (104) and a line to which the output voltage of the second driving voltage generator circuit is imparted, wherein the first driving voltage generator circuit (11, CC11) generates the first driving voltage ($V_{OC}$) on the basis of the voltage applied to the voltage input line (104), and the voltage input line (104) may be imparted with the first input voltage or the output voltage of the second driving voltage generator circuit through the diode, depending on the first input voltage and the output voltage of the second driving voltage generator circuit.

Consequently, when the supply of the first input voltage has stopped or the like, a required power is supplied to the first driving voltage generator circuit through the diode, without requiring any special control, and malfunction of the switching circuit when the supply of the first input voltage has stopped or the like is moderated.

Note that the switching device (1, 1A, 1B) may also be said to encompass a switching control device connected to the switching circuit 13. The switching control device corresponds to the switching device (1, 1A, 1B) excluding the switching circuit 13.

An embodiment of the present invention may be subjected to various modifications as appropriate within the scope of the technical ideas expressed in the claims. The foregoing embodiments are merely examples of an embodiment of the present invention, and the meanings of the terms in the invention and each structural element are not limited to those described in the foregoing embodiments. The specific numerical values expressed in the foregoing descriptive text are merely for the sake of example, and obviously may be changed to various other numerical values.

The invention claimed is:

1. A switching device comprising:
a switching circuit including a switching element;
a first driving voltage generator circuit that generates a first driving voltage on the basis of a first input voltage;
a second driving voltage generator circuit that generates a second driving voltage on the basis of a second input voltage;
a control circuit, driven by the first driving voltage, that generates a control signal;
a drive circuit, driven by the second driving voltage, that turns the switching element on or off by supplying to the switching element a drive signal based on the control signal;
a voltage generation controller that controls the second driving voltage generator circuit so that an operation of generating the second driving voltage by the second driving voltage generator circuit is allowed after activation of the control circuit; and
a diode provided between a voltage input line and a line to which the output voltage of the second driving voltage generator circuit is imparted, wherein
the first driving voltage generator circuit is formed to be capable of generating the first driving voltage by using the first input voltage or the second driving voltage output from the second driving voltage generator circuit;
the first driving voltage generator circuit generates the first driving voltage on the basis of the voltage imparted to the voltage input line, and
the voltage input line is imparted with the first input voltage or the output voltage of the second driving voltage generator circuit through the diode, depending on the first input voltage and the output voltage of the second driving voltage generator circuit.

2. The switching device according to claim 1, wherein the voltage generation controller performs operational control of the second driving voltage generator circuit on the basis of a voltage value of the first driving voltage, or an activation signal generated by the control circuit on the basis of the first driving voltage.

3. The switching device according to claim 2, wherein the voltage generation controller allows the operation of generating the second driving voltage by the second driving voltage generator circuit when the voltage value of the first driving voltage becomes equal to or greater than a designated threshold value, or when the activation signal is supplied from the control circuit.

* * * * *